United States Patent
Stayton (10) Patent No.: US 10,288,727 B2
(45) Date of Patent: May 14, 2019

(54) SYSTEMS AND METHODS FOR PROVIDING AN ATC OVERLAY DATA LINK

(71) Applicant: Aviation Communication & Surveillance Systems LLC, Phoeinx, AZ (US)

(72) Inventor: Gregory T. Stayton, Peoria, AZ (US)

(73) Assignee: AVIATION COMMUNICATION & SURVEILLANCE SYSTEMS LLC, Phoenix, AZ (US)

( * ) Notice: Subject to any disclaimer, the term of this patent is extended or adjusted under 35 U.S.C. 154(b) by 0 days.

(21) Appl. No.: 15/786,407

(22) Filed: Oct. 17, 2017

(65) Prior Publication Data

US 2018/0038951 A1 Feb. 8, 2018

Related U.S. Application Data

(63) Continuation of application No. 12/105,248, filed on Apr. 17, 2008, now Pat. No. 9,791,562.
(Continued)

(51) Int. Cl.
| | |
|---|---|
| *G01S 13/76* | (2006.01) |
| *G01S 13/91* | (2006.01) |
| *G01S 7/00* | (2006.01) |
| *G01S 13/78* | (2006.01) |
| *H04L 5/02* | (2006.01) |

(Continued)

(52) U.S. Cl.
CPC ............ *G01S 13/765* (2013.01); *G01S 7/003* (2013.01); *G01S 13/784* (2013.01); *G01S 13/91* (2013.01); *H04L 5/02* (2013.01); *H04L 25/4902* (2013.01); *H04L 27/02* (2013.01); *H04L 27/10* (2013.01); *H04L 27/18* (2013.01); *H04L 27/26* (2013.01); *H04L 27/32* (2013.01); *H04L 1/0003* (2013.01); *H04L 1/0009* (2013.01)

(58) Field of Classification Search
CPC ...... G01S 13/784; G01S 7/003; G01S 13/765; G01S 13/91–13/9303; H04L 25/4902; H04L 27/26; H04L 27/18; H04L 27/32; H04L 27/02; H04L 27/10; H04L 5/02; H04L 1/0009; H04L 1/0003
See application file for complete search history.

(56) References Cited

U.S. PATENT DOCUMENTS

| | | | | |
|---|---|---|---|---|
| 5,636,123 | A * | 6/1997 | Rich ..................... | G01S 5/0072 342/29 |
| 7,215,713 | B2 * | 5/2007 | Walker ............... | H04B 7/18513 267/246 |
| 2008/0032644 | A1 * | 2/2008 | Hunter .................. | H03F 1/0205 455/127.1 |

OTHER PUBLICATIONS

Bullock, Scott R. "Transceiver and System Design for Digital Communications." Noble Publishing Corporation. Atlanta, Ga. 2000. pp. 41-42.*

* cited by examiner

*Primary Examiner* — Matthew M Barker
(74) *Attorney, Agent, or Firm* — Dickinson Wright PLLC (57) ABSTRACT

Embodiments of the present invention disclose systems and methods for providing an ATC Overlay data link. Through embodiments of the present invention, existing ATC (or other) modulated signals using existing standard frequencies may be utilized to transmit (e.g., from an aircraft transponder) additional information in a manner that does not render the transmitted signal unrecognizable by legacy ATC equipment. Legacy equipment will be able to demodulate and decode information that was encoded in the transmitted signal in accordance with preexisting standard modulation (Continued)

formats, and updated equipment can also extract the additional information that was overlaid on transmitted signals.

5 Claims, 6 Drawing Sheets

Related U.S. Application Data

(60) Provisional application No. 60/926,126, filed on Apr. 24, 2007, provisional application No. 60/931,274, filed on May 21, 2007.

(51) Int. Cl.
*H04L 25/49* (2006.01)
*H04L 27/02* (2006.01)
*H04L 27/10* (2006.01)
*H04L 27/18* (2006.01)
*H04L 27/26* (2006.01)
*H04L 27/32* (2006.01)
*H04L 1/00* (2006.01)

Gray Code Data Encoding

| BIT 1 | BIT 2 | BIT 3 | Phase Shift State |
|-------|-------|-------|-------------------|
| 0 | 0 | 0 | 0 |
| 0 | 0 | 1 | $\pi/4$ |
| 0 | 1 | 1 | $2\pi/4$ |
| 0 | 1 | 0 | $3\pi/4$ |
| 1 | 1 | 0 | $4\pi/4$ |
| 1 | 1 | 1 | $5\pi/4$ |
| 1 | 0 | 1 | $6\pi/4$ |
| 1 | 0 | 0 | $7\pi/4$ |

*Fig. 10*

SYSTEMS AND METHODS FOR PROVIDING AN ATC OVERLAY DATA LINK

CROSS REFERENCE TO RELATED APPLICATIONS

This application is a continuation of U.S. patent application Ser. No. 12/105,248 filed Apr. 17, 2008 pending issuance as U.S. Pat. No. 9,791,562, which claims full benefit of and priority to U.S. Provisional Patent Application No. 60/926,126 filed Apr. 24, 2007 titled, "Systems and Methods of Providing an ATC Overlay Data Link", and to U.S. Provisional Patent Application No. 60/931,274, filed May 21, 2007 titled "Systems and Methods of Providing an ATC Overlay Data Link," the disclosures of which are fully incorporated herein by reference for all purposes.

DESCRIPTION OF THE INVENTION

Field of the Invention

The present invention relates to systems and methods for encoding and modulating digital information, and more particularly, to systems and methods for establishing an alternative data link through multiple modulation of air-traffic-control-related electronic signals.

Background of the Invention

Travel by aircraft is generally a safe and efficient way for travelers to reach remote destinations. Over the years, as the popularity of air travel has dramatically increased, the need for techniques for safely managing the flow of aircraft has also risen.

To address air traffic safety issues, aircraft have been equipped with avionics equipment such as transponders that assist air traffic controllers in identifying, tracking, and managing aircraft in flight.

Through radio frequency transmissions, transponders provide air traffic controllers and other suitably equipped aircraft with information such as aircraft identification, altitude, and other aircraft-specific data. Ready access to such information allows controllers and pilots to utilize airspace in a safer and more efficient manner. As the density of air traffic grows, it is understandable that there is a growing need for more information to be relayed between aircraft and ground stations on a near-real-time basis.

Currently, FAA Air Traffic Control and most other ATC controlling authorities around the world use standard modulation schemes to ensure interoperability of their radio frequency signals with other aircraft and systems. For example, the Minimum Operational Performance Standards for Air Traffic Control Radar Beacon System/Mode Select (ATCRBS/Mode S) Airborne equipment, promulgated by RCTA as RTCA/DO-181C (and incorporated by reference herein in its entirety) defines pulse position modulation on 1090 MHz for Mode S transponder and older transponder (ATCRBS transponders) replies to 1030 MHz ground station and TCAS interrogations. By using standard protocols aircraft state information as well as other data can be relayed aircraft to ground, ground to aircraft, or in some instances aircraft to aircraft.

The volume of information that must be transmitted from aircraft continues to increase as more advanced avionics and traffic control systems become available. Likewise, the need to transmit diverse information of all kinds also drives the desire to utilize aircraft systems to send data. However, because of the large number of required transponder replies in heavily travelled areas (such as in the vicinity of an airport, where hundreds of replies per second are generated), there are worldwide limits on the number of transponder broadcast transmissions permitted each second from each aircraft. For example, the limit for Automatic Dependent Surveillance Broadcast (ADS-B) is currently set to 6.2 transmissions per second to prevent the additional ADS-B interference from potentially all the aircraft near a major airport creating a situation where the ATC ground station becomes unable to receive surveillance replies from aircraft in the terminal area being controlled by ATC.

ADS-B squitter data content has already been defined for the most part by industry committees such as SC186, and there is little remaining room for future growth. In fact, systems currently envisioned and being developed by avionics systems designers will likely need to transmit more data than can be sent within the 6.2 squitters per second limit. The ability to employ more data in avionic systems is now and will continue to be needed.

Figure 2:
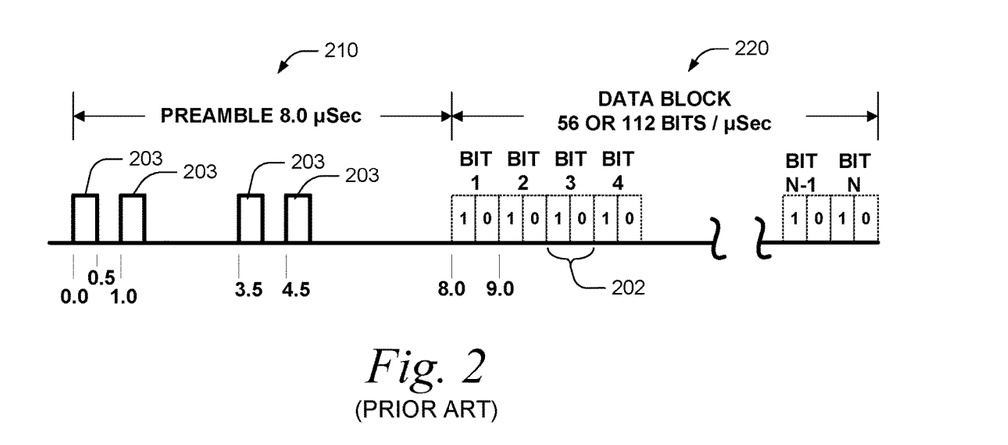
FIG. 2 illustrates a standard prior art transponder reply data format and timing diagram.

The existing Mode S transponder reply data format (also known as squitters when they are sent unsolicited by an interrogation) is implemented with a pulse position modulation technique, where the position of a pulse determines whether a bit is a one or a zero. Referring to the transmission reply data format and timing diagram 200 in FIG. 2, the first four pulses 203 within the 8 microsecond preamble time 210 are called preamble pulses and are used to determine that the pulse position data that follows is for a Mode S reply (or squitter). ADS-B squitters use the long Mode S reply format and thus contain 112 bits in the data block 220 per squitter. In other applications, 56 bits may be transmitted.

Data is transmitted through digital data encoded in the Data Block 220. A bit interval 202 comprises two sub-intervals defining the logical state of a bit symbol. When a pulse is in the "1" sub-interval position (FIG. 3, 301) of a bit interval 202, that bit value is a 1 and when a pulse is in the "0" sub-interval position (FIG. 3, 302) of a bit interval 202, that bit value is a 0. Only one pulse either in a "0" or a "1" position is permitted for each bit interval or bit symbol period (such as bit interval 202) of the entire message shown 200.

Figure 3:
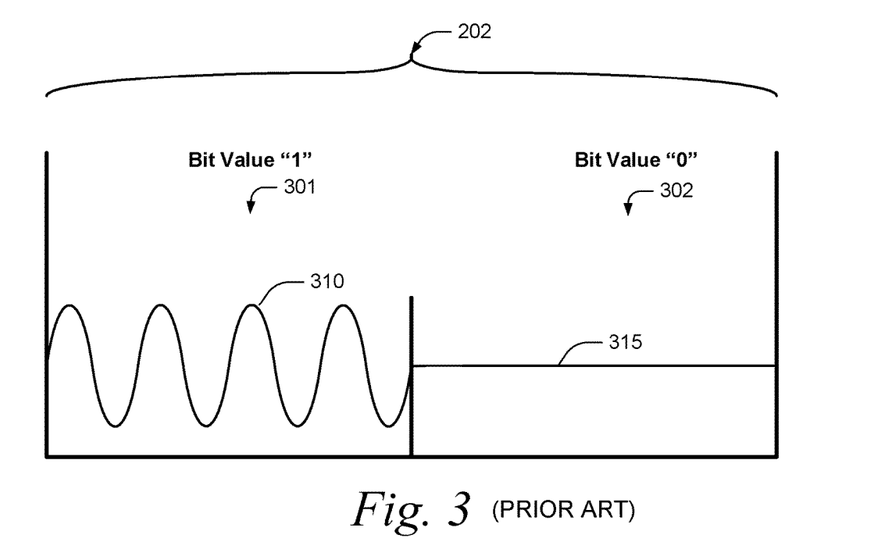
FIG. 3 depicts an expanded view of an exemplary bit interval of the reply data format, with a logical data value "1" pulse encoded.

Referring to FIG. 3, an expanded view of bit interval 202 is shown. A carrier wave in the form of a pulse waveform 310 is being transmitted in the "1" position 301, and no pulse is transmitted 315 during the "0" sub interval, and therefore, this bit interval represents the value of logical "1." Note that the sinusoidal waveform 310 provided in the drawing is for illustration purposes only, and as a standard frequency for ADS-B replies is currently 1090 MHz +/−1 MHz, approximately 545 cycles of the waveform 310 would normally occur during the 0.5 microsecond sub-interval 301. The phase of the waveform 310 is also unimportant for existing transponder reply standards. What is needed are methods and systems to make more efficient use of transponder reply messages to increase data throughput and provide for additional communication links.

SUMMARY OF THE INVENTION

Embodiments of the present invention disclose systems and methods for providing an ATC Overlay data link. Through embodiments of the present invention, existing ATC (or other) modulated signals using existing standard frequencies may be utilized to transmit (e.g., from an aircraft transponder) additional information in a manner that does not render the transmitted signal unrecognizable by legacy ATC equipment. Legacy equipment will be able to demodulate and decode information that was encoded in the transmitted signal in accordance with preexisting standard modulation formats, and updated equipment can also extract the additional information that was overlaid on transmitted signals.

The overlay data may comprise any information desired to be transmitted, including but not limited to additional or supplementary ATC information. Existing transponder and ground station frequencies may be utilized for the transmission, and the signals modulated with the overlay data may be received by any receiver, including but not limited to receivers in aircraft and ground stations. The modulation protocols or types utilized in both in the primary ATC signal and the overlaid signal are selectable from any suitable modulation schemes, but those of skill in the art appreciate that modulation protocols utilized in various embodiments of the invention may be selected to be a non-varying modulation, including, but not limited to fixed modulation protocols. As used herein, the term "overlay modulation" includes modulating a signal that has previously been modulated, including chases where a single or a plurality of modulations were previously applied to the signal.

Embodiments provide a method for encoding an overlaid message onto a provided modulated ATC signal, the method comprising selecting an overlay modulation protocol; and modulating the provided modulated ATC signal with an overlay message using the selected overlay modulation protocol. The provided modulated ATC signal may be modulated with any protocol such as a pulse position modulation protocol, and the overlay modulation protocol may be any protocol such as phase shift keying modulation. When phase shift keying modulation is utilized, phase states may be assigned using Gray Code to further reduce bit error. In one embodiment, modulating the provided modulated ATC signal with an overlay message using the selected overlay modulation protocol further comprises applying the overlay modulation to one or more modulated message bit intervals within a data block in the modulated ATC signal. In various embodiments where the overlay modulation comprises a PSK modulation protocol, a phase transition in a carrier signal in a bit interval is modulated into the carrier, and such phase transition may occur at any location in the carrier signal in the bit interval. In one embodiment, such phase transition may occur in the carrier signal proximate to a mid-point of the bit interval, or proximate an initial point of the bit interval. A plurality of phase transitions may also be modulated into the carrier signal within any particular bit interval. The location of a phase transition within a bit interval may be selected to optimize spectral performance, noise performance, or any other criterion.

The ATC modulation protocol and the overlay modulation protocol may comprise any single or combination digital modulation scheme, including, but not by way of limitation any of the following modulation protocols: binary phase shift keying modulation (BPSK); quadrature phase shift keying modulation (QPSK); 8-phase shift keying modulation (8-PSK); differential phase-shift keying (DPSK); DNPSK modulation, where N is an even integer and a multiple of 2; frequency shift keying (FSK); amplitude shift keying (ASK); quadrature amplitude modulation (QAM); orthogonal frequency-division multiplexing (OFDM); minimum-shift keying (MSK); asymmetric phase-shift keying, (APSK); pulse position modulation (PPM); amplitude modulation (AM); frequency modulation (FM); or any other modulation form using amplitude, phase, or frequency signal characteristics and methods of use; and combinations of any of those protocols. Single or multiple modulation operations may be performed on the ATC signal to encode additional overlay information. The modulated ATC signal may be a standard ATC format as described above, or may comprise any number of signal types alone or in combination, such as a transponder reply signal; a squitter signal; an ADS-B reply signal; a 1030 MHz interrogation signal; a 1030 MHz TCAS signal; a General Aviation UAT transceiver signal on a UHF frequency band; at least one of a signal within a voice band or a data band operating within an ATC HF, VHF, and UHF band, a VDL Mode 4 ADS-B modulated signal; DME; SATCOM; or any other avionics equipment that radiates a modulated rf signal; a baseband signal for transmitting data; and combinations of those signal types.

The overlay data may be encoded, encrypted, supplemented, interleaved, or otherwise processed before or after overlay modulation occurs. Such processing may be intended to reduce bit error rates by providing supplemental check bits, parity bits, CRC bits, Reed-Solomon bit error detection and correction coding or data, or other information to conduct error checking or error correction coding. Interleaving may be used to spread overlay data or data symbols across multiple bit intervals within a transponder reply or squitter message, or across multiple reply or squitter messages in order to reduce the effect of burst noise on the bit error rate of the transmitted message.

In another embodiment, a method for decoding an overlaid message from an overlay modulated signal is provided. The method includes demodulating the overlay modulated signal with a first modulation protocol to produce a first message; demodulating the overlay modulated signal with a second modulation protocol to produce an overlay message; wherein the first message and the overlay message may be independently demodulated from the overlay modulated signal.

The first or second modulation protocol may comprise any single or combination digital modulation scheme, including, but not by way of limitation any of the following modulation protocols: binary phase shift keying modulation (BPSK); quadrature phase shift keying modulation (QPSK); 8-phase shift keying modulation (8-PSK); differential phase-shift keying (DPSK); DNPSK modulation, where N is an even integer and a multiple of 2; frequency shift keying (FSK); amplitude shift keying (ASK); quadrature amplitude modulation (QAM); orthogonal frequency-division multiplexing (OFDM); minimum-shift keying (MSK); asymmetric phase-shift keying, (APSK); pulse position modulation (PPM); amplitude modulation (AM); frequency modulation (FM); or any other modulation form using amplitude, phase, or frequency signal characteristics and methods of use; and combinations of any of those protocols.

Embodiments of the present invention provide that the received overlay data may be decoded, decrypted, supplemented, de-interleaved, or otherwise processed after receipt. Such processing may be intended to reduce bit error rates by providing supplemental check bits, parity bits, CRC bits, Reed-Solomon bit error detection and correction, or other information to conduct error checking or error correction coding. De-interleaving may be used to extract overlay data from multiple bit intervals within a transponder reply or squitter message, or across multiple reply or squitter messages in order to reduce the effect of burst noise on the bit error rate of the transmitted message. Further, additional demodulations may occur to extract additional overlaid data from the received signal. These additional demodulations may use any modulation protocol as defined herein.

When the overlay modulation is phase shift keying-type (PSK) modulation, recovery of encoded data phases may be complicated by fluctuations or drift in the phase of the carrier frequency. Normally, with ATCRBS or ADS-B type replies, the phase of the carrier does not matter as long as the pulse position is correctly modulated. To obtain an accurate data phase and reduce bit errors of the PSK, embodiments of the present invention compensate for the phase drift whether synchronous or differential PSK techniques are utilized. In one embodiment, the second modulation protocol comprises phase shift keying; and a phase error is subtracted from a signal phase to produce a data phase. The phase error may be computed by identifying one or more preamble pulses within the overlay modulated signal; identifying one or more data pulses within the overlay modulated signal; determining one or more phases of a carrier frequency within at least one of the one or more preamble pulses and the one or more data pulses; and comparing the one or more phases of the carrier frequency to a predetermined frequency to compute a phase error. In the case of a differential PSK modulation, embodiments of the present invention provide that the second modulation protocol comprises differential phase shift keying; and a first phase of a first carrier wave pulse within a first bit interval is computed by comparing the first phase of the first carrier wave pulse within the first bit interval to a second phase of a second carrier wave pulse within a second bit interval.

In another embodiment, a method of the present invention provides for transmission and receipt of overlay data through an ATC-type response or squitter signal. Embodiments provide an overlay data link through a provided ATC signal modulated with a first modulation protocol, through a method comprising: modulating the provided modulated ATC signal with an overlay message using a second modulation protocol to produce an overlay modulated signal; transmitting the overlay modulated signal by an ATC transponder; receiving the overlay modulated signal at a receiver such as with a TCAS receiver; and extracting an overlaid message from an overlay modulated signal, wherein a first message is obtained by demodulating the overlay modulated signal with the first modulation protocol; and the overlay message is retrieved from the overlay modulated signal by demodulating the overlay modulated signal with the second modulation protocol. As described previously, the first and overlay modulation protocols may comprise any type of digital modulation schemes, such as one embodiment where the first modulation protocol is pulse position modulation and the overlay modulation protocol is phase shift keying modulation. Alternatively, the first or second modulation protocol may comprise any single or combination digital modulation scheme, including, but not by way of limitation any of the following modulation protocols: binary phase shift keying modulation (BPSK); quadrature phase shift keying modulation (QPSK); 8-phase shift keying modulation (8-PSK); differential phase-shift keying (DPSK); DNPSK modulation, where N is an even integer and a multiple of 2; frequency shift keying (FSK); amplitude shift keying (ASK); quadrature amplitude modulation (QAM); orthogonal frequency-division multiplexing (OFDM); minimum-shift keying (MSK); asymmetric phase-shift keying, (APSK); pulse position modulation (PPM); amplitude modulation (AM); frequency modulation (FM); or any other modulation form using amplitude, phase, or frequency signal characteristics and methods of use, and combinations of any of those protocols.

There is also provided an ATC overlay data link system. One embodiment comprises a first modulator, the first modulator configured to modulate ATC data into a first modulated signal through a first modulation protocol; a second modulator coupled to the first modulator, the second modulator configured to modulate an overlay message into the first modulated signal using a second modulation protocol to produce an overlay modulated signal; a transponder comprising a transmitter and an antenna wherein the transponder is coupled to the second modulator and the transponder is configured to transmit the overlay modulated signal; and a TCAS receiver coupled to an antenna, a first demodulator and a second demodulator, wherein the first demodulator is configured to extract the ATC data by demodulating the overlay modulated signal with the first modulation protocol; and the second demodulator is configured to extract the overlaid message from an overlay modulated signal.

As described previously, the first and overlay modulation protocols may comprise any type of digital modulation schemes, such as one embodiment where the first modulation protocol is pulse position modulation and the overlay modulation protocol is phase shift keying modulation. Alternatively, the first or second modulation protocol may comprise any single or combination digital modulation scheme, including, but not by way of limitation any of the following modulation protocols: binary phase shift keying modulation (BPSK); quadrature phase shift keying modulation (QPSK); 8-phase shift keying modulation (8-PSK); differential phase-shift keying (DPSK); DNPSK modulation, where N is an even integer and a multiple of 2; frequency shift keying (FSK); amplitude shift keying (ASK); quadrature amplitude modulation (QAM); orthogonal frequency-division multiplexing (OFDM); minimum-shift keying (MSK); asymmetric phase-shift keying, (APSK); pulse position modulation (PPM); amplitude modulation (AM); frequency modulation (FM); or any other modulation form using amplitude, phase, or frequency signal characteristics and methods of use; and combinations of any of those protocols.

Embodiments of the present invention provide that the system may encode/decode, encrypt/decrypt, supplement, interleave/de-interleave, or otherwise process data for overlay and data extraction. Such processing may be intended to reduce bit error rates by providing supplemental check bits, parity bits, CRC bits, Reed-Solomon Bit Error Detection and Correction, or other information to conduct error checking or error correction coding. Interleaving/De-interleaving may be used to extract overlay data from multiple bit intervals within a transponder reply or squitter message, or across multiple reply or squitter messages in order to reduce the effect of burst noise on the bit error rate of the transmitted message. Further, additional demodulations may occur to extract additional overlaid data from the received signal. These additional demodulations may use any modulation protocol as defined herein.

There is further provided an overlay data link embodiment. The overlay data link comprises a first modulator, the first modulator configured to modulate a first data stream data into a first modulated signal through a first modulation protocol; a second modulator coupled to the first modulator, the second modulator configured to modulate an overlay message into the first modulated signal using a second modulation protocol to produce an overlay modulated signal; a transmitter, wherein the transmitters is coupled to the second modulator and the transmitter is configured to transmit the overlay modulated signal; and a receiver, a first demodulator and a second demodulator, wherein: the first demodulator is configured to extract first data stream by demodulating the overlay modulated signal with the first modulation protocol; and the second demodulator is configured to extract the overlaid message from an overlay modulated signal. In one embodiment of the overlay data link, the first modulation protocol is pulse position modulation and the overlay modulation protocol is phase shift keying modulation. The first and second modulation protocols may comprise any appropriate amplitude, phase, and frequency modulation, including, but not limited to binary phase shift keying modulation (BPSK); quadrature phase shift keying modulation (QPSK); 8-phase shift keying modulation (8-PSK); differential phase-shift keying (DPSK); DNPSK modulation, where N is an even integer and a multiple of 2; frequency shift keying (FSK); amplitude shift keying (ASK); quadrature amplitude modulation (QAM); orthogonal frequency-division multiplexing (OFDM); minimum-shift keying (MSK); asymmetric phase-shift keying, (APSK); pulse position modulation (PPM); amplitude modulation (AM); frequency modulation (FM); and combinations thereof.

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to the present exemplary embodiments of the invention, examples of which are illustrated in the accompanying drawings. Wherever possible, the same reference numbers will be used throughout the drawings to refer to the same or like parts.

Embodiments of the present invention provide methods for overlaying additional data on top of existing ATC data without affecting existing ATC transponder/TCAS/Ground Station/Multilateration or other existing equipment. Embodiments of the present invention may use any form of modulation overlaid on top of existing ATC data, and depending on implementation, the overlaid data may be undetectable by equipment that processes legacy ATC signals. This permits the use of existing equipment within the ATC environment, and the use of new equipment that can be either backwards compatible and/or independent of ATC existing data formats permitting more data throughput efficiency using the same ATC bandwidth and frequency assignments of 1030 and 1090 Mhz. Embodiments of the present invention utilize a transponder reply data format and timing diagram similar to that shown in FIG. 2. However, as discussed in more depth below, embodiments of the present invention provide additional modulation within each pulse interval 202 that may not be detected by existing ATC equipment or methods, but can provide additional data bits within the same reply.

Figure 1:
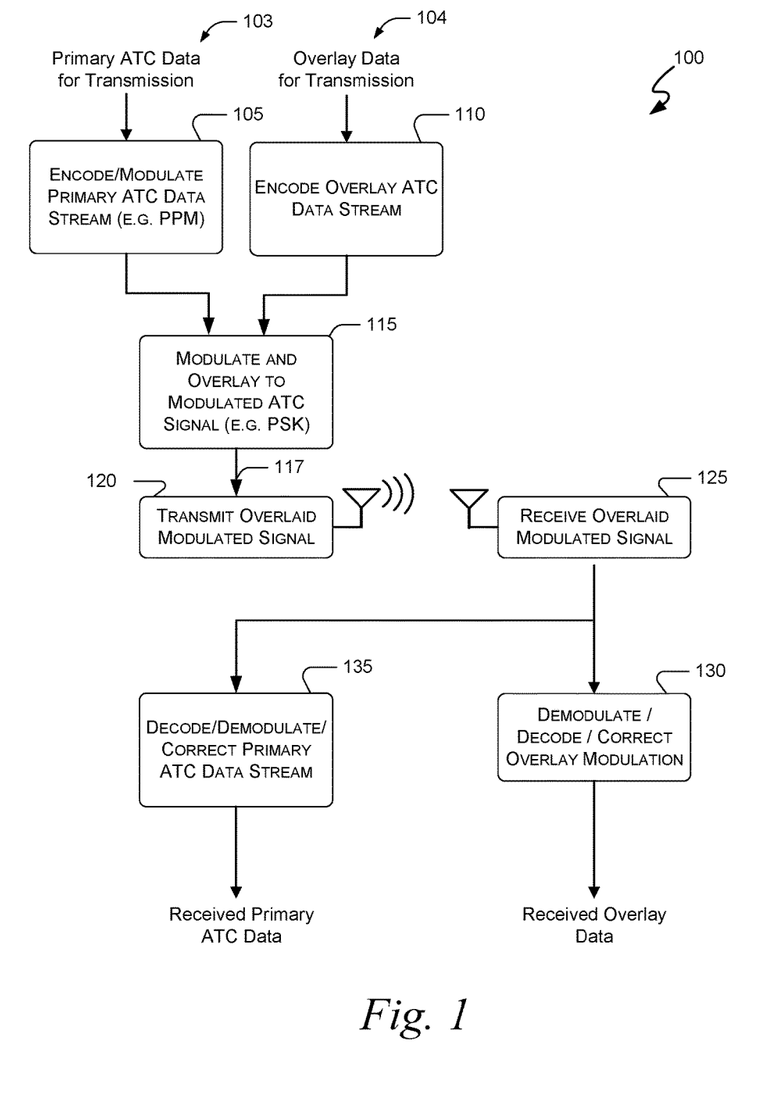
FIG. 1 illustrates a block diagram of an embodiment of a system of the present invention.

Turning to FIG. 1, a block diagram 100 illustrates an embodiment of a system of the present invention. A primary ATC data stream 103 is input to an encoder and modulator 105 that produces a modulated signal (such as by pulse position modulation) that complies with existing standards such as an ADS-B squitter or reply transmissions (see, e.g., FIG. 2). Data 104 that is desired to be transmitted through an overlay data link is encoded 110, if desired, with information such as parity bits, CRC (cyclic redundancy check) codes, encryption keys, or any other information or encodings that are desired to be applied to the overlay data. The encoded overlay data is then further 115 modulated into the modulated ATC stream 115 in a manner that provides a reply/squitter signal that is compatible with existing hardware yet contains information in excess of that defined by current transponder standards. One exemplary method to achieve such overlay modulation compatibility is to initially modulate the ATC signal with a pulse position modulation that is acceptable by currently deployed hardware, and then apply the overlay modulation with a technique such as phase shift keying "PSK." PSK is a digital modulation scheme that conveys data by changing, or modulating, the phase of a reference signal (e.g., the carrier wave), as opposed to selectively applying a pulse to bit symbol times as is utilized in pulse position modulation. Since varying the phase of the carrier signal within each defined time frame in an ATC-encoded reply signal does not impact the ability of legacy hardware to decode the original ATC data message, the PSK modulation is nondestructive and may be independently demodulated. Put another way, the twice-modulated signal 117 carries the ATC data 103 that is modulated and directly decodable by conventional PPM techniques, in addition to additional data 104 that has been overlaid on the modulated signal in a non-destructive manner, such as by PSK modulation.

The modulated signal 117 may then be transmitted 120 and received by a receiver 125 that is configured to receive ATC transponder reply transmissions (such as a ground station or another transponder in a suitably equipped aircraft). In various embodiments, the transmitter 120 and the receiver 125 may comprise any electronic equipment capable of sending and/or receiving RF signals, including, but not limited to ATC radars, TCAS transponders, ADS-B transponders, and ground stations of any type. In one embodiment, ADS-B ground stations can receive and transmit ATC Overlay messages on top of various outputs such as Traffic Information Service Broadcasts (TIS-B, Automatic Dependent Surveillance Re Broadcasts (ADS-R).

The received signal is then demodulated 135 by PPM demodulation 135 to recover the original primary ATC data 103 after any necessary decoding. The received signal is also demodulated 130 to obtain the overlay data 104, which may be presented in several channels after any necessary decoding. Therefore, the twice-modulated signal 117 may be demodulated with multiple techniques independently and each data stream (103, 104) respectively independently recovered.

Any form of modulation may be overlaid on top of any ATC-modulated signals, whether such modulation currently exists or is created at a future date. In alternate embodiments, additional data may be overlaid by modulation on top of an overlaid modulation as well, and this modulation is not limited to modulation that is undetectable by existing equipment. Further, the modulation is not limited to 1090 MHz squitters and replies, but can also be used on 1030 MHz (currently interrogation by radars and TCAS), on the General Aviation UAT transceiver UHF frequency band, ATC HF, VHF and UHF voice and data bands, on the VDL Mode 4 ADS-B modulation used for ADS-B in limited locales within Europe, DME; SATCOM; or any other avionics equipment that radiates a modulated RF signal and at baseband for ATC terminal or other networks currently sending data over landline or microwave links. Thus any form of ATC modulation that is used can have an overlaid modulation applied to it at any frequency. This can also include, for example, overlaid modulation on a modulation applied to Air Transport airborne weather radar for communication links. Therefore, embodiments of the present invention provide that any overlay modulation type (whether interfering in some manner or not) may be overlaid on or added to or encrypted with any modulation type for whatever purpose desired, such as, but not limited to ATC applications, any commercial data relay purposes, low probability of intercept applications, low probability of detection techniques, low probability of spoofing purposes, and encryption.

Figure 4:
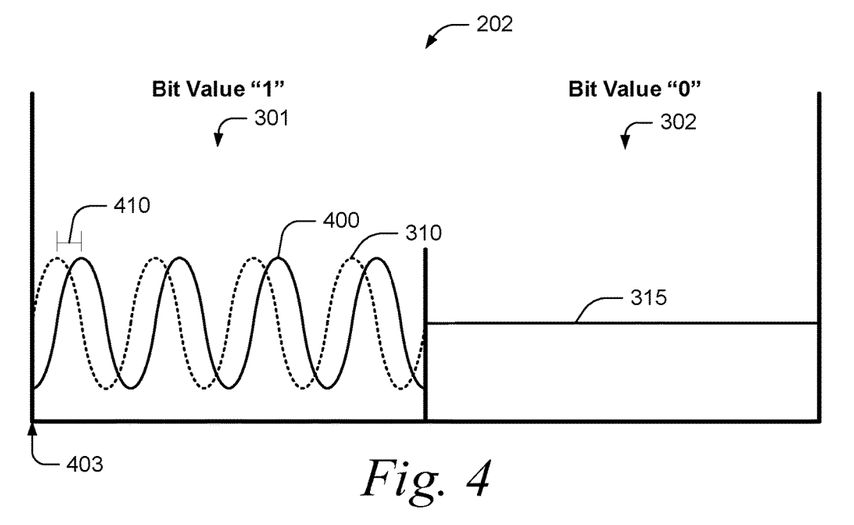
FIG. 4 shows one bit interval of modulated ATC signal with overlay data, where the carrier has been phase shifted ninety degrees, the phase shift occurring at or near the beginning of the bit interval.
Figure 5:
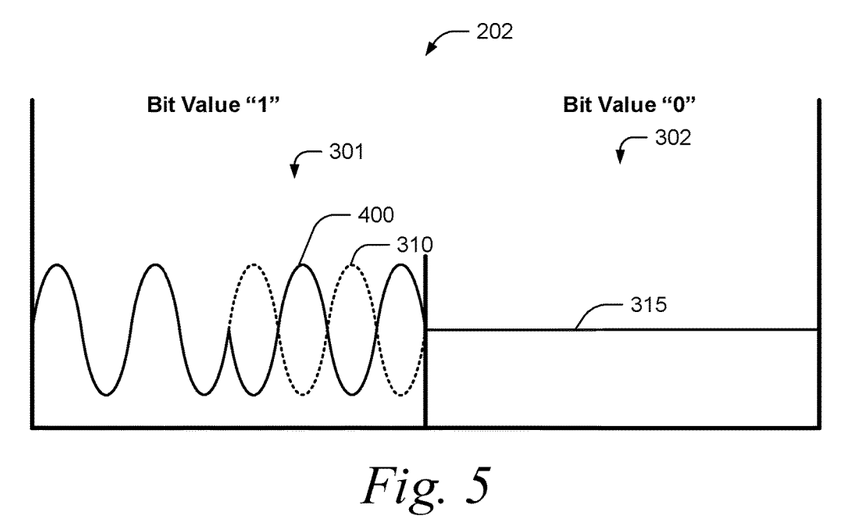
FIG. 5 shows one bit interval of modulated ATC signal with overlay data, where the carrier has been phase one hundred eighty degrees, the phase shift occurring approximately at the midpoint of a carrier within a sub-bit interval.

Embodiments of the present invention may employ phase shift keying (PSK) modulation within each of the 112 bit pulses in the data block 220. Turning to FIG. 4, an expanded view of one exemplary bit interval 202 of the data block 220 is shown, with an ATC data value of logical "1" (carrier pulse 400 is present in "1" sub-interval position, 301) and the phase shifted carrier signal 400 is overlaid with phase modulation by phase shift 410 of ninety degrees. The phase shift in this embodiment occurred at or near the beginning 403 of the logical "1" sub-interval position 301. The original unshifted carrier signal 310 is shown for comparison. Depending on the particular PSK implementation, this phase shift may correspond to one bit or several bits of overlay data. Note that the sinusoidal waveform 310 provided in the drawing is for illustration purposes only, and as a standard frequency for ADS-B replies is currently 1090 MHz +/−1 MHz, approximately 545 cycles of the waveform 310 would normally occur during the 0.5 microsecond sub-interval 301. As the applicable ATC standards do not care about the phase of the carrier wave, the presence of an acceptable frequency and amplitude waveform in the appropriate bit sub-interval position 301 is all that is needed to provide the logical "1" originally encoded.

Phase information can then be sent with a differential phase between each pulse representative of a plurality of states used to represent a plurality of bits. Each phase difference is detected by examining the phase of a previous pulse to the phase of the next pulse to eliminate the effects of relative aircraft motion. For the first phase reference pulse relative to Bit 1 case, any of the preamble pulses 203 may be used, and from then forward each previous bit pulse phase can be used as the reference for the next bit phase.

Other PSK methods can be used to send data such as a synchronous transmission of phase, where comparison to a reference that is synchronized in phase to the incoming reply signal modulation is used to determine a phase value for each pulse. The preamble pulses of the Mode S reply message can be used to synchronize a reference oscillator source to the incoming message RF signal using, for instance, a phase-locked-loop oscillator or a Costas loop that can be locked to the incoming signal phase and frequency, which is then used as a phase reference for all the data bits.

Figure 6:
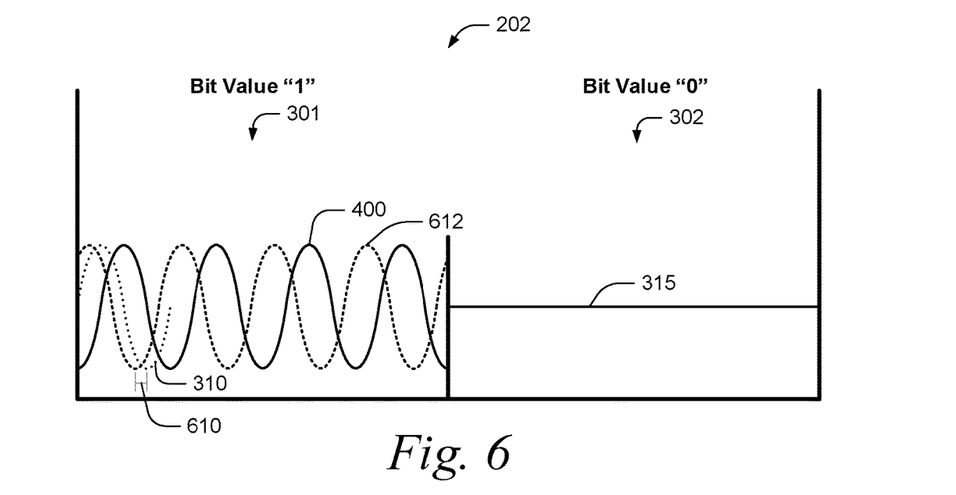
FIG. 6 shows one bit interval of modulated ATC signal with overlay data, where the carrier has been phase shifted ninety degrees, and frequency drift has affected the carrier.

In legacy ATC systems, the frequency of the signal being transmitted are in the range of 1090 MHz plus or minus 1 MHz, and drift of the phase of the carrier signal is generally not of concern provided the signal envelopes within predetermined timing intervals is within established ranges, such as those set forth in RTCA standard DO-181C. To recover a phase shift encoded within the broadcast carrier signal, embodiments of the invention provide for obtaining the data phase by synchronous or asynchronous means. Turning to FIG. 6, original carrier 310 (shown only partially for clarity) would have undergone a frequency drift 610, producing a new drifted-phase carrier 612. Without knowledge of the amount of drift 610, the exact phase of the phase-shifted carrier 400 may be difficult to determine. In one embodiment, phase drift 610 is accounted for via phase synchronous means but with the frequency asynchronous, for instance by utilizing an integrator and accumulating and storing the phase drift as a phase error signal that can be subtracted out from the phase of the current signal. In another illustrative embodiment, after a predetermined amount of data pulses are received (for instance 7 pulses), a local oscillator tracks the received signal via a Costas loop, allowing frequency and phase synchronization. The local oscillator is then driven with an offset frequency to maintain synchronization. Through this approach, interfering signals with different frequencies can be distinguished through use of a matched filter, and through use of matched filters with synchronized frequency and phase, noise performance can be improved significantly, for instance by about 3 dB.

Aircraft motion and signal-to-noise-ratio, as mentioned above, may be taken into account when determining an acceptable bit error rate (BER). For instance, if two aircraft, one transmitting a reply and the one receiving the reply are traveling towards one another at a rate of 1200 knots, which is 2000 ft. per second, the relative velocities can significantly affect the phase error seen by the receiving aircraft. Since the wavelength in free space is about 1 foot at ATC 1030 MHz and 1090 MHz frequencies, a phase error of about 2000 ft./sec. X 360 degrees phase X 112 usec (112× $10^{-6}$ seconds per Mode S reply message length)=80 degrees phase error. Since the 80 degrees of error is spread over the entire Mode S message and each phase can either be differentially compared from the previous to the next bit or synchronized out as described above, the phase error between each bit then is about 80 degrees /112 bits per microsecond=0.71 degrees phase error per bit. Thus, any encoding scheme that can tolerate a phase error of 0.71 degrees between each bit is realizable, but is also affected by the signal to noise ratio to accurately measure phase. For a reasonable signal to noise ratio that exceeds 10 db, a PSK encoding scheme that provides 360 states or 1 degree per state could be tolerated. Usually a power of two is used for binary encoding, so 256 ($2^8$) states could be used to provide 8 bits of data per PPM pulse.

Figure 10:
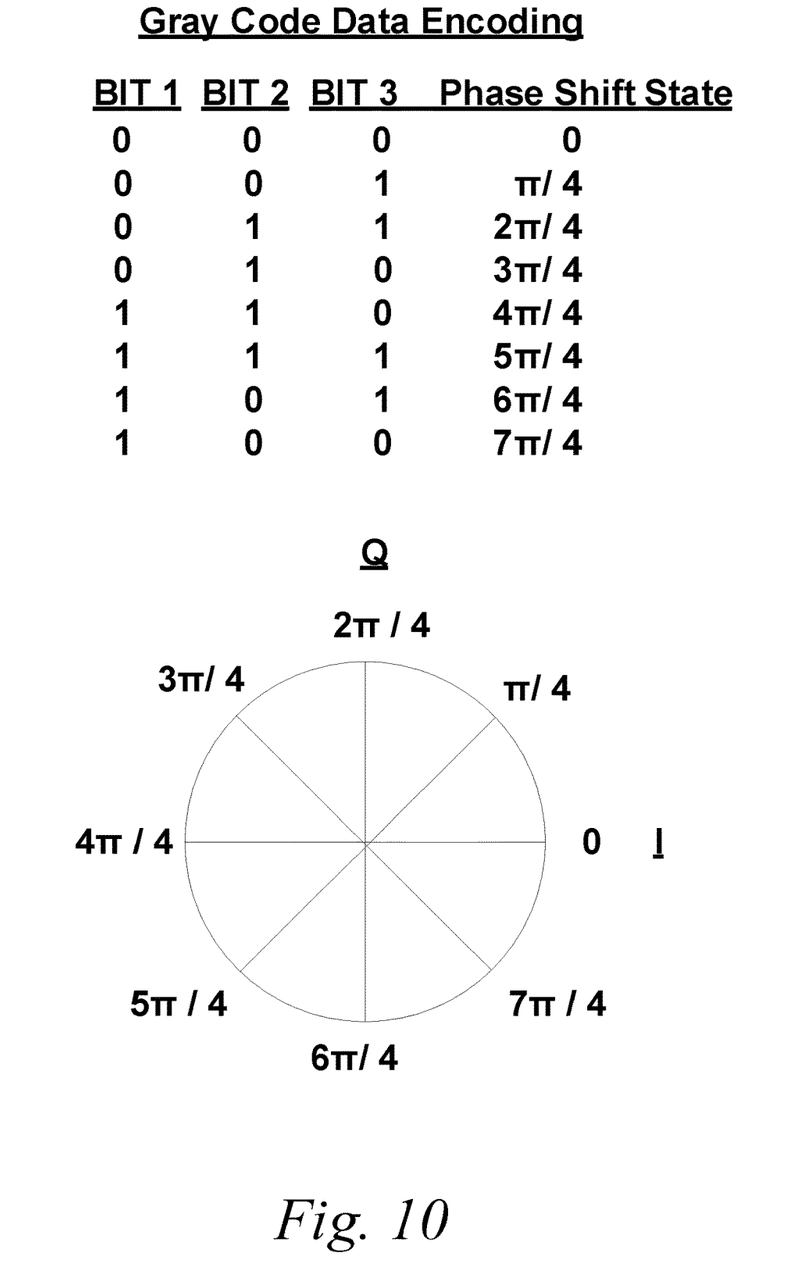
FIG. 10 shows a constellation diagram and corresponding Gray Code symbol assignments for an 8-PSK modulation scheme of the present invention.

To decrease the effects of noise on signal to noise ratio, embodiments of the present invention use a D8PSK (Differential 8-state Phase Shift Keying) modulation scheme. Referring to FIG. 10, each of 8 states is shown from 0 degrees through 360 degrees with each state separated by 45 degrees representing 3 bits. This provides 112 bits X3 =336 bits per message additional to the 112 bits of the original Pulse Position Modulation (PPM) Mode S reply message. Thus, if an additional 3 bit message is sent for each of 6.2 squitters per second, a total of 336 bits per message X6.2 messages=2083 additional bits can be sent via the overlay modulation. Therefore, by modulating each pulse-bit whether in the zero or one position, with D8PSK modulation, a new data link is then created with 3 bits of data for every previous PPM bit. In one embodiment, the new data link would not be detected by existing ATC TCAS and transponder equipment unless it is equipped to detect the D8PSK modulation, ensuring backward compatibility with existing systems.

In various embodiments, states can be encoded to reduce the number of bit errors per symbol. Other schemes using additional parity bits to produce symbols that are completely orthogonal can be used to provide additional interference immunity.

In alternate embodiments, modulation schemes providing more bits per second such as D16PSK (4 bits per message bit) or D32PSK (5 bits per message bit) can be used depending on the amount of noise immunity versus data rate required. Secondary modulation schemes may also be used in conjunction with error correction and control schemes in order to minimize bit error rate and correspondingly increase signal to noise ratios in noisy environments. Also, bits can be encoded into states that only permit one bit change per adjacent state change (Grey Code). This can reduce bit errors to only one bit for changes between adjacent states and helps with noise and interference immunity, as discussed later.

Figure 7:
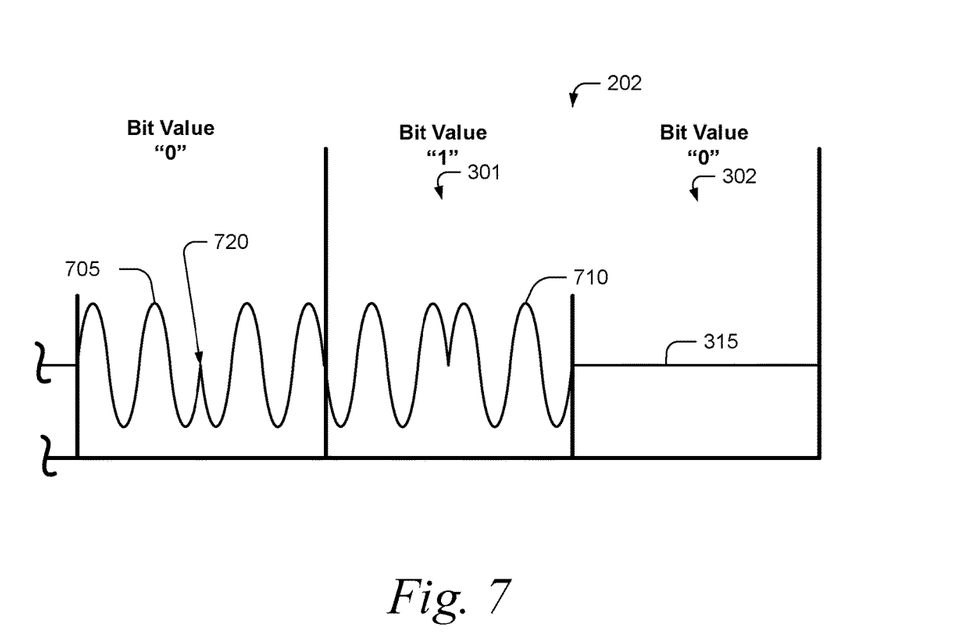
FIG. 7 illustrates one and one half bit intervals, illustrating a merged carrier signal from a bit value of 0 from a previous bit interval, and a bit value of 1 from a following bit interval with midpoint one hundred eighty degree phase shifts.
Figure 8:
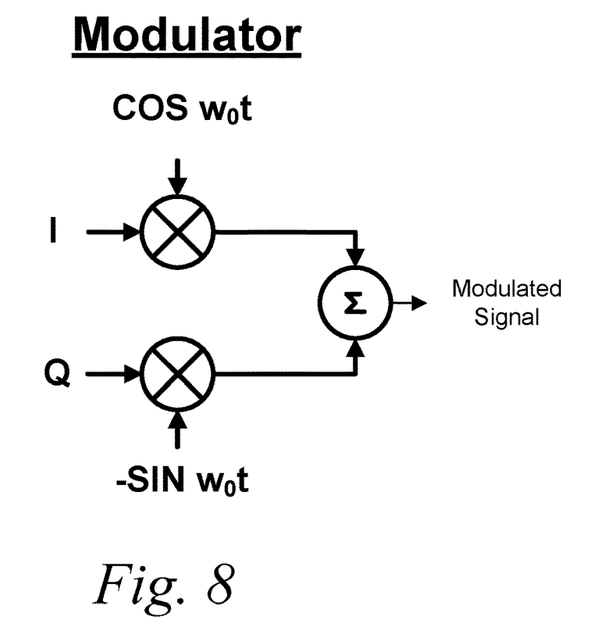
FIG. 8 shows an exemplary modulator of the present invention.
Figure 9:
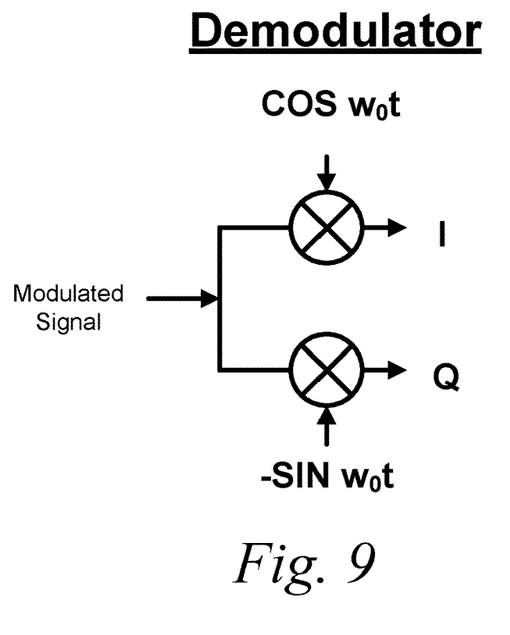
FIG. 9 illustrates an exemplary demodulator of the present invention.

Additional techniques can be used to minimize frequency spectral power effects or bandwidth required to accommodate the additional modulation. For instance, when two pulses are positioned next to one another, such as shown in FIG. 7, and in the case of a sudden change in phase 720 in the first pulse 705 to a different phase in the next pulse 710, an amplitude notch may occur between pulses affecting the bandwidth of the reply. However, if the phase is slowly varied between the middle of the first pulse to the middle of the second pulse, the phase variation occurs over a greater time period and the amplitude notch can be made to be very small, permitting compliance to existing bandwidth requirements for Mode S replies and having no effects upon existing equipment in the field. The phase information can then be read in the beginning of the pulse for the first bit interval (before any phase changes to the next pulse) and near the end of the second pulse for the second bit interval (after a phase change from the first to the second pulse is complete) when two pulses have merged into one, permitting the use of this MSK (Minimum Shift Keying) phase change technique. This approach also can be adapted for significant or multiple intra-sub-interval phase shifts, if embodiments provide for multiple phase shifts per sub-interval.

MSK type of modulation phase change across the pulse will further reduce any spectral effects. The worst case spectral effect is for a phase shift from 0 to 180 degrees, and could be accommodated and tested to ensure compliance with existing industry specifications for a Mode S reply. Spectral and amplitude specifications for Mode S reply emissions can currently be found in RTCA DO-181C.

Additional modulation types with varying degrees of BER, detection gain, and bit throughput can be used. These include, but are not limited to: general phase shift keying modulations; binary phase shift keying modulation (BPSK); quadrature phase shift keying modulation (QPSK); 8-phase shift keying modulation (8-PSK); differential phase-shift keying (DPSK); DNPSK modulation, where N is an even integer and a multiple of 2; frequency shift keying (FSK); amplitude shift keying (ASK); quadrature amplitude modulation (QAM); orthogonal frequency-division multiplexing (OFDM); minimum-shift keying (MSK); asymmetric phase-shift keying, (APSK); pulse position modulation (PPM); amplitude modulation (AM); frequency modulation (FM); or any other modulation form using amplitude, phase, or frequency signal characteristics and methods of use; and combinations of modulation techniques.

In principle, any modulation type can be used, but should be constrained to meet DO-181C amplitude and spectral requirements such that existing ATC equipment is not affected, but new equipment can transmit and detect the overlaying modulation. In addition, some form of bit error detection and correction can be used such as that presented in RTCA DO-181C, Mode S Minimum Operational Performance Specification, and RTCA DO-185A, TCAS Minimum Operational Performance Specification, as an example to improve message reception.

A more suitable means of bit error detection and correction for Phase Shift Keying modulation can, for example, include the use of additional bits to provide orthogonal symbol (cross correlation is zero for one bit errors) encoding with zero correlation between symbol sets (bit patterns between symbols are significantly different by several bit states). For example, the bit values can be represented, as shown below in Table 1 (for two bits to simplify the discussion). Note that this method may require that more bits be used within each symbol to represent the lesser number of bit values (or states), so that a more unique bit pattern is transmitted and received, and can be corrected in the presence of noise or interference with a higher degree of certainty.

TABLE 1

| Bit Values | Symbol Data |
|---|---|
| 00 | 0000 |
| 01 | 0101 |
| 10 | 1100 |
| 11 | 1001 |

Another embodiment of the present invention addresses limiting the effect of burst errors, such as for a single interfering pulse where the "BIT 1" pulse position of the Mode S reply has been overlaid by a stronger in amplitude interfering pulse. This situation could destroy an entire 3 bit symbol for the case of D8PSK (3 bits per symbol). However, if each D8PSK bit value is sent as only one bit of 3 separate messages, then only one bit of each message may be affected, making it possible for 2 of the messages to remain uncorrupted. For example, from Table 1, the last bit of the Symbol Data for Bit Value 10 could be corrupted into a 1, resulting in the sequence from Table 1 to be a 1101 instead of a 1100. Then, the 1101 is incorrect, since it is not a valid symbol and by knowing which bit has been corrupted from the interfering pulse position it is possible to determine that 1100 is the correct symbol for a one bit error, since none of the other symbols are of the form "11XX".

Non-ideal communications channels, noise, atmospheric conditions, interference, or other phenomena may induce errors into the message being communicated, whether or not the transmitted message has been overlaid with additional encoded information. In various embodiments of the present invention, conventional error reduction or correction approaches may be applied to reduce bit error rate, such as utilization of a parity overlay or CRC check scheme as described in RTCA/DO-181C, Reed-Solomon bit error detection and correction, or other error conventional detection and correction schemes.

Embodiments of the present invention include the use of a Gray-Code for each phase state transmitted which is most useful for the case where an interfering pulse is near to the same amplitude as the data pulse and cannot be detected, use of a four bit message symbol where only one parity bit is used for every three message bits to detect and correct single bit errors (as opposed to traditional 8 bit symbols where half the bits are parity bits), interleaving of message bit symbols to limit the number of errors per message symbol due to sequential interfering pulses so that most errors can be corrected (after de-interleaving) by changing the state of a single bit, and using a parity overlay encoding scheme on top of the last 24 bits of the address of the intended recipient for point to point messaging or with an all ones address for broadcast messages as is done now for Automatic Dependent Broadcast messages (ADS-B) as described in RTCA DO-260A ADS-B MOPS in conjunction with the error detection and correction algorithm as described in RTCA DO-185A TCAS MOPS. Alternate embodiments provide methods for bit error detection and correction, and may be more efficient in terms of the number of phase message bits that can be corrected per each 112 bit PPM Mode S reply.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for providing an overlay data link through a provided air traffic control (ATC) signal modulated with a pulse position modulation (PPM) modulation protocol, the method comprising:
   modulating respective pulse bits of the provided modulated ATC signal with an overlay message using D8PSK modulation to produce an overlay modulated signal, wherein the overlay modulated signal comprises a single phase transition modulated within the carrier signal within a bit interval that includes the pulse bit;
   transmitting the overlay modulated signal by an ATC transponder;
   receiving the overlay modulated signal at a receiver configured to receive ATC pulse-position modulated signals; and
   extracting an overlaid message from an overlay modulated signal, wherein:
   a first message is obtained by demodulating the overlay modulated signal with the first modulation protocol; and
   the overlay message is retrieved from the overlay modulated signal by demodulating the overlay modulated signal with D8PSK modulation, wherein:
   the first message and the overlay message is independently demodulatable from the overlay modulated signal; and
   the overlay message comprises three bits of data for each phase transition overlaid into the first message through D8PSK modulation.

2. The method as disclosed in claim 1, wherein modulating the modulated ATC signal with an overlay message further comprises applying the overlay modulation to a carrier signal within one or more modulated message bit intervals within a data block in the modulated ATC signal.

3. The method as disclosed in claim 1, wherein the ATC transponder is selected from the group consisting of: an ATCRBS-compatible transponder; an ADS-B transponder; an ATC radar; and a ground station.

4. The method as disclosed in claim 1 further comprising decoding the overlay message using at least one of:
   one or more parity bits;
   one or more CRC bits;
   Reed-Solomon bit error detection and correction data; and
   one or more error correction code bits.

5. An overlay data link comprising:
   a first modulator, the first modulator configured to modulate a first data stream data into a first modulated signal through a first modulation protocol comprising a pulse position modulation (PPM) protocol;
   a second modulator coupled to the first modulator, the second modulator configured to modulate an overlay message into respective pulse bits of the first modulated signal using D8PSK to produce an overlay modulated signal, wherein the overlay modulated signal comprises a single phase transition modulated within the carrier signal within a bit interval that includes the pulse bit;
   a transmitter, wherein the transmitter is coupled to the second modulator and the transmitter is configured to transmit the overlay modulated signal; and
   a receiver, a first demodulator and a second demodulator, wherein:
   the first demodulator is configured to extract first data stream by demodulating the overlay modulated signal with the first modulation protocol; and
   the second demodulator is configured to extract the overlaid message from an overlay modulated signal; and
   the first data stream and the overlaid message is independently demodulatable from the overlay modulated signal.

* * * * *